(12) United States Patent
De Ambrosi et al.

(10) Patent No.: US 7,091,337 B2
(45) Date of Patent: Aug. 15, 2006

(54) PROCESS FOR THE PHYSICAL DEPOLYMERIZATION OF GLYCOSAMINOGLYCANES AND PRODUCTS OBTAINED THEREFROM

(75) Inventors: Luigi De Ambrosi, Santhia (IT); Sergio Gonella, Santhia (IT); Elena Vismara, Milan (IT)

(73) Assignee: Laboratori Derivati Organici S.p.A., Trino Vercelli (IT)

( * ) Notice: Subject to any disclaimer, the term of this patent is extended or adjusted under 35 U.S.C. 154(b) by 212 days.

(21) Appl. No.: 10/477,293

(22) PCT Filed: Mar. 11, 2003

(86) PCT No.: PCT/EP03/02462

§ 371 (c)(1),
(2), (4) Date: Nov. 10, 2003

(87) PCT Pub. No.: WO03/076474

PCT Pub. Date: Sep. 18, 2003

(65) Prior Publication Data

US 2004/0186279 A1 Sep. 23, 2004

(30) Foreign Application Priority Data

Mar. 12, 2002 (EP) .................... 02425142

(51) Int. Cl.
*C08B 37/10* (2006.01)
(52) U.S. Cl. .......................... 536/124; 536/21; 536/53; 204/157.6; 204/157.63
(58) Field of Classification Search ................ 536/21, 536/53, 124; 514/54; 204/157.6, 157.63
See application file for complete search history.

(56) References Cited

U.S. PATENT DOCUMENTS 4,987,222 A    1/1991    De Ambrosi et al. .......... 536/21

6,383,344 B1 * 5/2002 Miller et al. ............. 204/157.6

FOREIGN PATENT DOCUMENTS

| EP | 0269937 B1 | | 2/1991 |
| WO | WO 90/04607 | * | 5/1990 |
| WO | WO 90/04607 A2 | | 5/1990 |
| WO | WO 00/69444 | | 11/2000 |

OTHER PUBLICATIONS

Baquey C. et al., "ESR Study of Gamma-Irradiated Sodium Heparinate" *Radiation Research*, 70:82-90 (1997).
Ershov B.G., "Radiochemical Destruction of Cellulose and Other Polysaccharides", *Uspekhi Khimiki*, 67:353-375 (1998).
Jooyandeh F. et al., "Chemical Effects of Gamma-Irradiation of Aqueous Solutions of Heparin and Keratan Sulphate", *Radiation Research*, 45:455-461 (1971).

* cited by examiner

*Primary Examiner*—Shaojia A. Jiang
*Assistant Examiner*—Ganapathy Krishnan
(74) *Attorney, Agent, or Firm*—Leon R. Yankwich; David G. O'Brien; Yankwich & Associates, P.C.

(57) ABSTRACT

The invention relates to a process for the depolymerization of glycosaminoglycanes characterized by the use of high-energy radiation in the presence of an organic compound selected from the group consisting of ethers, alcohols, aldehydes, amides and formic acid. The invention also relates to intermediate depolymerized heparin having a molecular weight of between 1,000 and 5,500, absorbance at 400 nm below 0.300 and ratio $SO_3^-/COO^-$ equal to or higher than in the starting heparin. The intermediate depolymerized heparin can be dissolved in a buffer solution and fractionated by gel permeation for obtaining the desired molecular weight.

7 Claims, No Drawings

PROCESS FOR THE PHYSICAL DEPOLYMERIZATION OF GLYCOSAMINOGLYCANES AND PRODUCTS OBTAINED THEREFROM

This application is a United States national filing under 35 U.S.C. 371 of international (PCT) application No. PCT/EP03/02462, filed Mar. 11, 2003, designating the US, and claiming priority to European Application No. 02 425 142.3, filed Mar. 12, 2002.

STATE OF THE ART

Glycosaminoglycanes are natural products of large pharmaceutical interest. Among the most widely used we can mention heparin, dermatan, heparansulphate and chondroitines.

The molecular weight of the natural products varies considerably and normally ranges from 5 to 40 kDa. It is however known that for certain applications lower molecular weights lead to higher pharmacological activity. The high molecular weight of these compounds often renders impossible their oral administration. Furthermore, it is known that specific activities of glycosaminoglycanes are related to relatively short saccharide sequences. Thus, it would be very advantageous to depolymerize glycosaminoglycanes reducing the molecular weight without loosing the active sites present in the molecule.

The chemical depolymerization of glycosaminoglycanes is well known in the art and leads to glycosaminoglycanes of lower MW but also with a lower S content. EP 394 971 discloses an enzymatic or chemical depolymerization process. The obtained heparin oligomers have a sulphur content lower than 9%.

WO 90/04607 discloses a depolymerization of heparin and dermatansulfate by the use of $H_2O_2$ and $Cu^{2+}$. The ratio $SO_3^-/COO^-$ is slightly lower than in the starting heparin. U.S. Pat. No. 4,987,222 discloses a method for the depolymerization of heparin by the use of gamma rays. The examples disclose the preparation of heparin of Mw around 5,000 Da and with a high S content. However, the heparin produced by this method presents a certain amount of degradation products as a result of uncontrolled side reactions. The patent shows a direct relationship between the amount of radiation and the reduction in $M_w$. However, the use of radiation according to U.S. Pat. No. 4,987,222 makes it possible only a limited reduction in $M_w$ of heparin. Once a certain value of radiation is overcome, the colour becomes dark.

It is therefore desirable to reduce the molecular weight of glycosaminoglycanes without substantially modifying the chemical structure of the same.

SUMMARY OF THE INVENTION

The present invention relates to a physical process for the depolymerization of glycosaminoglycanes in the presence of an organic compound selected from ethers, alcohols, aldeheides, amides and formic acid.

It also relates to the glycosaminoglycanes obtained by this process.

DETAILED DESCRIPTION OF THE INVENTION

The present invention provides a physical depolymerization process which reduces the molecular weight of glycosaminoglycanes without substantially modifying the chemical structure of the same.

The objective is achieved through use of high-energy radiation in the presence of an organic compound. When using heparin as a starting material, this process results in a low to ultra-low molecular weight heparin characterized by low absorbance at 400 nm and high S content.

More specifically, the ratio $SO_3^-/COO^-$ of the depolymerized glycosaminoglycanes according to the invention is higher than the ratio of the starting glycosaminoglycanes; in the case of heparin, it is preferably higher than 2.3, more preferably higher than 2.35.

The starting materials to be used in the process according to the present invention are natural glycosaminoglycanes such as heparin, heparansulphate, dermatane and chondroitine. Other suitable starting materials are derivatives of glycosaminoglycanes obtained by known methods. Thus, for example, the N-acetyl or N-sulphate groups of the residues of hexosamine can be transformed in amino groups through N-desulphation or N-deacetylation reactions and the sulphate groups of the uronic acids through desulphation reactions can give rise to epoxy groups.

In another embodiment, it is possible to use as a starting material for the process of the present invention a glycosaminoglycane which has already undergone a depolymerization process either chemical or enzymatic or by high-energy radiation. The use of partly depolymerized glycosaminoglycanes is for example relevant in case of heparin which has undergone an acid pretreatment that has as a side effect partial depolymerization, or when depolymerizing functionalized glycosaminoglycanes. The conditions used for the introduction of functional groups are sometimes also causing reduction of the molecular weight of the polysaccharide.

Another example of use as starting material of low molecular weight heparin, is in the production of microheparins ($M_w$ around 1,200–1,600 Da). In this case it might be preferred to perform the depolymerization in two steps. Such a process falls within the scope of the present invention provided that at least one step is performed according to the invention.

Thus, not only it is possible to perform both steps by using high-energy radiation, but it is possible to perform a first depolymerization step by using high energy radiation followed by a second step using chemical-enzymatic depolymerization, or to perform a first step of chemical-enzymatic depolymerization followed by high energy radiation depolymerization.

The process of the present invention allows reduction of the molecular weight of the glycosaminoglycane without sensible modification of the chemical structure of the polysaccharide. More specifically, the process of the present invention is characterized by a S content of the low-ultra low molecular weight glycosaminoglycane equal to or higher than the original glycosaminoglycane together with an absorbance at 400 nm preferably lower than 0.300, most preferably lower than 0.200.

The high-energy radiation used to depolymerize the glycosaminoglycanes can be any radiation which results in the generation of radical on the glycosaminoglycanes; the preferred radiation is gamma radiation, preferably obtained from the following sources: $^{60}Co$ $^{241}Am$ $^{137}Cs$ and $^{226}Ra$; the most preferred gamma radiation is the one obtained from $^{60}Co$ as a source. $^{60}Co$ has an half life time of 5.3 years and emits two photons with an energy of 1.17 and 1.33 MeV.

The amount of radiation used in the depolymerization process depends on several factors: the type of glycosaminoglycanes, the desired final Mw, the amount and type of organic compound used. In general, the amount of radiation will vary in the range 50–300 kGy, preferably 100–250 kGy, more preferably 120–200 kGy.

In fact, the structure of the glycosaminoglycane influences the efficiency of the depolymerization process. In general, the higher the sulfur content, the higher the amount of radiation required for the same reduction of molecular weight. Also, an increase in the amount of organic compound, requires an increase in the amount of radiation to obtain the same reduction of Mw.

The organic compound according to the invention is selected from the group consisting of alcohols, ethers, aldehydes, amides and formic acid.

Preferably, the organic compound is selected from compounds of formula I, II and III.

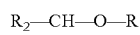  (I)

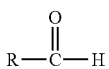  (II)

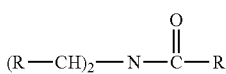  (III)

wherein each R is independently selected from the group consisting of H, OH, CHO, $C_1$–$C_6$ alkyl and acyl, optionally substituted by oxygen atoms; two R groups optionally join together to form a ring.

Preferred examples of alcohols are: methanol, ethanol, n-propanol, isopropanol, n-butanol, isobutanol, glycerol.

Preferred examples of ethers are: tetrahydrofurane, dioxane, diethylether, tertbutylmethylether, dioxolane.

Examples of aldehydes are formaldehyde, glyoxal, acetaldehyde or stabilized forms thereof (trioxane, glyoxal trimeric dihydrate).

Preferred examples of amides are: N,N-dimethylformamide, N,N-dimethylacetamide, N,N-diethylformamide, N-methylpyrrolidone.

The concentration of glycosaminoglycane in the solution to be submitted to radiation can vary in a broad range. Preferably it is comprised between 2 and 25% w/v, more preferably between 5 and 15%.

The amount of organic compound according to the invention depends on several parameters, but it is generally comprised between 0.1 and 5%. When using an amount of radiation up to 100 kGy, the preferred amount of organic compound is comprised between 0.1 and 1%, while in the case of amount of radiation higher than 100 kGy, the preferred amount of organic compound is comprised between 0.2 and 2%.

After irradiation, the solutions are optionally discolored either by using an oxidizing treatment or by passing them on proper resins. The solution is then generally purified by precipitation in hydrophilic solvent. The obtained paste can be redissolved in water and lyophilized by vacuum distillation.

It is also possible to fractionate the intermediate depolymerized glycosaminoglycane by Gel Permeation Chromatography. The fractions containing the desired molecular weights are collected, concentrated by ultra filtration and lyophilized.

Experimental Part

Gamma Ray Irradiation

The system which conveys the products around the source is a "multipass" type: the containers go around a number of times which is directly proportional to the dose the product is to be subjected to.

During each pass the product receives a dose of about 25 kGy.

The time taken to complete the route once depends on the power (or activity) of the radioactive source; it is periodically adjusted following the natural decay of the source, or taking into account additions of radioactive isotope.

Products Characterizations

Molecular mass (Mw and Mn) was determined by size exclusion chromatography (European Pharmacopoeia $4^{th}$ ed.: 2.2.30 and 2.2.46 for chromatography techniques and 01/2002:0828 p. 1297 for method).

Absorbance at 260 and 400 nm was determined according to European Pharmacopoeia $4^{th}$ ed 01/2002:0828 p. 1297.

Anti Xa activity was determined according to the method described in European Pharmacopoeia $4^{th}$ ed.: 2.2.30 and 2.2.46 for chromatography techniques and 01/2002:0828 p. 1297 for method.

Sulfate and carboxylate ions were determined by conductimetric techniques according to European Pharmacopoeia $4^{th}$ ed.: 2.2.38 and 01/2002:0828 p. 1297 for method.

EXAMPLE 1

Sodium heparin (100 g, Mw 14,800 Da) was dissolved in bi-distilled water containing 5 ml of isopropyl alcohol. The solution was brought to volume (1 l) and poured in a 1.5 l pyrex glass container, purged with argon and hermetically sealed. The container was irradiated with a total amount of 150 kGy, using a $^{60}$Co radiation source. The irradiated solution presented a pH comprised between 4.8 and 5.5 and a pale yellow color. It was discolored by a lightly aminated phenolic resin of the Duolite type and precipitated in acetone. The obtained paste was dissolved in water, distilled under vacuum and spray-dried. The intermediate depolymerized heparin had the following characteristics:

Mw: 4,980 Da
Organic sulfates: 12.20%
Uronic groups: 28.2%
$SO_3^-/COO^-$=2.40
Mw/Mn=1.4
Anti Xa: 109 U/mg The intermediate depolymerized heparin was dissolved in a buffer solution and fractionated by Gel Permeation for obtaining the desired Molecular Weight.

EXAMPLE 2

Sodium heparin (100 g, Mw 13,500 Da) was dissolved in 1 l of bi-distilled water containing 4 ml of isopropyl alcohol. The solution was poured in a 1.5 l pyrex glass container, purged with argon and hermetically sealed. The container was irradiated with a total amount of 180 kGy using a $^{60}$Co radiation source. The irradiated solution presented a dark yellow color. It was discolored by adding an oxidative substance, like hydrogen peroxide. The solution was kept at pH 8–8.5 by addition of NaOH 32% and under intensive stirring for 7 h.

The pH of the solution is then adjusted to 6.5 by using HCl 10%, then treated with $NaHSO_3$ until no more reaction of the oxidized substances is observed and precipitated by addition of acetone. The obtained solid is dissolved in water, the light fraction is distilled off and the heparin solution is spray-dried, obtained a light powder with the following characteristics:

Mw: 4,300 Da
Organic sulphates: 11.41%
Uronic groups: 27.79%
$SO_3^-/COO^- = 2.48$
Mw/Mn=1.7
Anti Xa: 92 U/mg The intermediate depolymerized heparin was dissolved in a buffer solution and fractionated by Gel Permeation for obtaining the desired Molecular Weight.

EXAMPLE 3

Comparison of Various Organic Compounds 1.8 kg of heparin is dissolved in water and the solution brought to the volume of 18 l. It then divided into 9 bottles containing each 2 l. The type and amount of organic compound used in each run is indicated in Table 1. In each case the concentration was 0.1 M. The starting heparin had a Mw=13,500 Da.

The amount of radiation was 180 kGy.

The data of table 1 shows that the presence of a compound according to the invention leads to a sharp reduction in the color as indicated by the value at 400 nm and also in a reduction of absorption at 260 nm, while the Mw remains substantially unchanged over the sample without organic compounds.

Comparative examples 7 and 8 show that the use of organic compounds belonging to various classes of compounds (esters and acids) different from those defined in the present invention, do not reduce the absorbance at 400 nm and 260 nm.

TABLE 1

| Run | Organic Compound | Amount | Mw Heparin Da | Abs 400 nm | Abs 260 nm |
|---|---|---|---|---|---|
| Comp 1 | — | — | 3,300 | 0.420 | 2.13 |
| 2 | isopropanol | 8.0 ml | 3,747 | 0.159 | 0.97 |
| 3 | ethanol | 5.7 ml | 3,611 | 0.117 | 0.93 |
| 4 | tetrahydrofurane | 8.1 ml | 3,908 | 0.098 | 0.79 |
| 5 | Glyoxal trimeric dihydrate | 21.0 g | 3,476 | 0.291 | 1.03 |
| 6 | formic acid | 3.7 ml | 4,477 | 0.206 | 1.08 |
| Comp 7 | acetic acid | 5.7 ml | 4,659 | 0.519 | 2.06 |
| Comp 8 | dimethylmalonate | 9.3 ml | 4,175 | 0.436 | 1.94 |

EXAMPLE 4

Influence of the Amount of Organic Compound

A serie of runs was performed using different amounts of isopropanol. 500 ml of a 10% w/v aqueous solution of heparin (Mw=14,300) was prepared and divided in 5 bottles.

To each bottle the amount of isopropanol indicated in Table 2 was added.

The solutions were irradiated with a total amount of radiation of 120 kGy.

The data of table 2 clearly indicates that the increase in isopropanol produces a decrease in the absorbance at 260 nm and an increase in MW. The value of absorbance at 260 nm, although in the ultraviolet region, is consistent with the visual appearance of the samples.

TABLE 2

| Run | Organic compound | Amount ml | Mw Heparin Da | Absorbance 260 nm |
|---|---|---|---|---|
| Comp 1 | — | — | 5,320 | 1.172 |
| 2 | i-propanol | 0.50 | 6,298 | 0.478 |
| 3 | i-propanol | 0.60 | 6,527 | 0.421 |
| 4 | i-propanol | 0.75 | 7,211 | 0.365 |
| 5 | i-propanol | 1.00 | 8,368 | 0.287 |

EXAMPLE 5

Depolymerization of Dermatansulfate 1 l of a water solution containing 100 g of dermatansulfate (Mw=28,000) and 4 ml of isopropanol was prepared. The solution was vented off with nitrogen and irradiated with 180 kGy of $^{60}Co$ gamma rays.

The clear solution was neutralized and directly precipitated with acetone. The light paste was dissolved in water, distilled off under vacuum and spay-dried. The intermediate depolymerized dermatandsulfate presented the following characteristics:

Mw=3,900 Da
Organic sulfates=6.39%
Uronic acid=26.78%
$SO_3^-/COO^-=1.44$
Mw/Mn=1.6
Colla=27 U/mg
Anti Xa=absent

What is claimed is:

1. A process for the depolymerization of glycosaminoglycanes comprising: irradiating glycosaminoglycanes with high-energy radiation in the presence of an organic compound selected from the group consisting of ethers, alcohols, aldehydes, amides and formic acid.

2. The process according to claim 1 wherein the glycosaminoglycane is heparin.

3. The process according to claim 1 wherein the high energy radiation is gamma radiation.

4. The process according to claim 1 wherein the organic compound is selected from the group consisting of methanol, ethanol, n-propanol, isopropanol, n-butanol isobutanol, glycerol, tetrahydroflirane, dioxane, diethylether, tertbutylmethylether, dioxolane, formaldehyde, glyoxal, acetaldehyde, N,N-dimethylformamide, N,N-dimethylacetamide, N,N-diethylformamide, N-methylpyrrolidone.

5. The process according to claim 1 wherein the amount of organic compound varies between 0.1 and 5%.

6. The process according to claim 1 wherein the amount of radiation used is higher than 100kGy and the amount of organic compound is comprised between 0.2 and 2%.

7. The process according to claim 1 wherein the high energy radiation is gamma radiation.

* * * * *

UNITED STATES PATENT AND TRADEMARK OFFICE
CERTIFICATE OF CORRECTION

PATENT NO. : 7,091,337 B2  Page 1 of 1
APPLICATION NO. : 10/477293
DATED : August 15, 2006
INVENTOR(S) : Luigi De Ambrosi, Sergio Gonella and Elena Vismara It is certified that error appears in the above-identified patent and that said Letters Patent is hereby corrected as shown below:

Column 6, line 50, Claim 4, a comma --,-- should be inserted between "n-butanol" and "isobutanol";

Column 6, line 51, Claim 4, "tetrahydroflirane" should be changed to --tetrahydrofurane--;

Column 6, line 60, Claim 7 should be deleted in its entirety.

Signed and Sealed this

Nineteenth Day of December, 2006

JON W. DUDAS
*Director of the United States Patent and Trademark Office*